United States Patent [19]
Gray et al.

[11] 3,748,656
[45] July 24, 1973

[54] APPARATUS FOR MONITORING PRESSURE VARIATIONS IN A FLUID PRESSURE SYSTEM

[75] Inventors: Samuel A. Gray, Sun Valley; Armando Perello, Northridge, both of Calif.

[73] Assignee: Textron Inc.

[22] Filed: Nov. 8, 1971

[21] Appl. No.: 196,674

[52] U.S. Cl........... 340/240, 340/239 R, 340/248 A
[51] Int. Cl. ........................................... G08b 21/00
[58] Field of Search................ 340/240, 239, 248 A; 324/61 R, 61 P, 71 SN; 73/396, 398 R, 49.3, 204, 196; 137/12

[56] References Cited
UNITED STATES PATENTS

| 3,199,348 | 8/1965 | Salera | 73/204 |
| 3,438,259 | 4/1969 | Bossert, Jr. | 73/398 R |
| 3,061,829 | 10/1962 | Roberts | 340/258 C |

Primary Examiner—John W. Caldwell
Assistant Examiner—Daniel Myer
Attorney—Nilsson, Robbins, Wills & Berliner

[57] ABSTRACT

Pressure transducer means for sensing system pressure and providing a signal proportional thereto is connected to an electrical differentiator which provides an electrical signal which is proportional to the rate of change of system pressure. The rate of change of system pressure electrical signal is then compared to a predetermined reference signal to provide an output electrical signal only when the rate of change signal equals or exceeds the reference signal for a predetermined period of time. The output signal is utilized to actuate a device or sound a warning as may be required.

13 Claims, 8 Drawing Figures

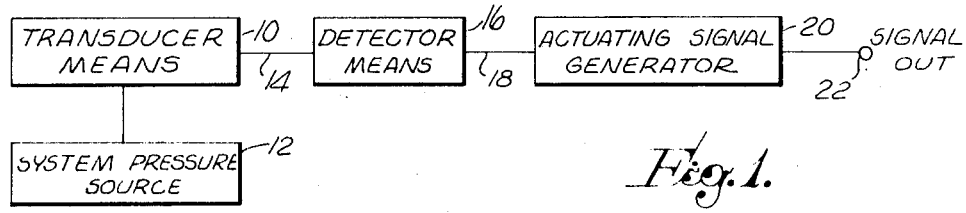
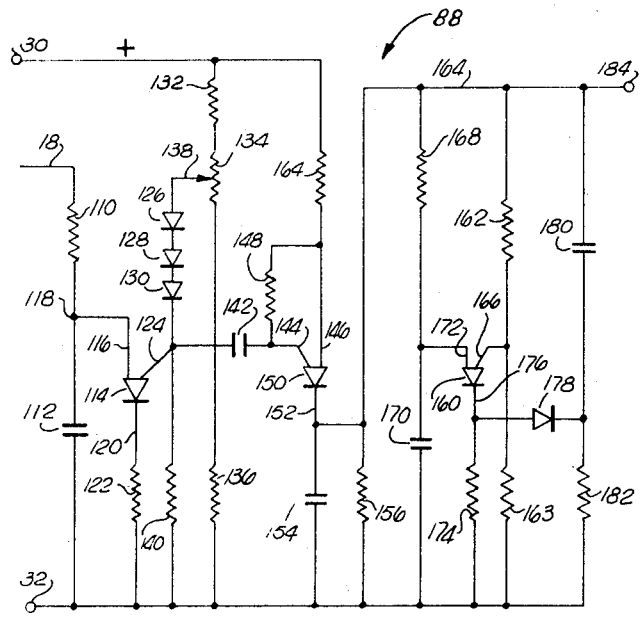
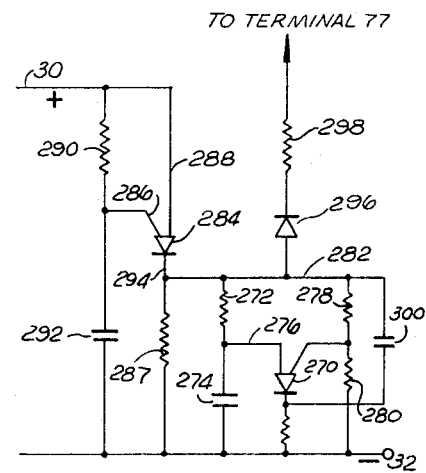
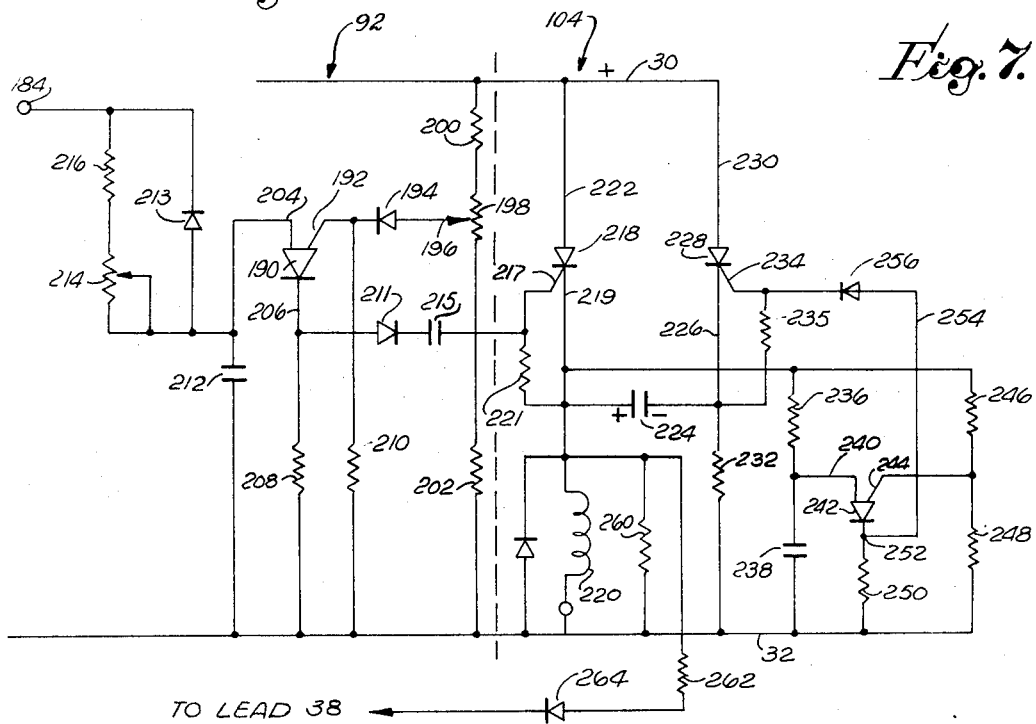

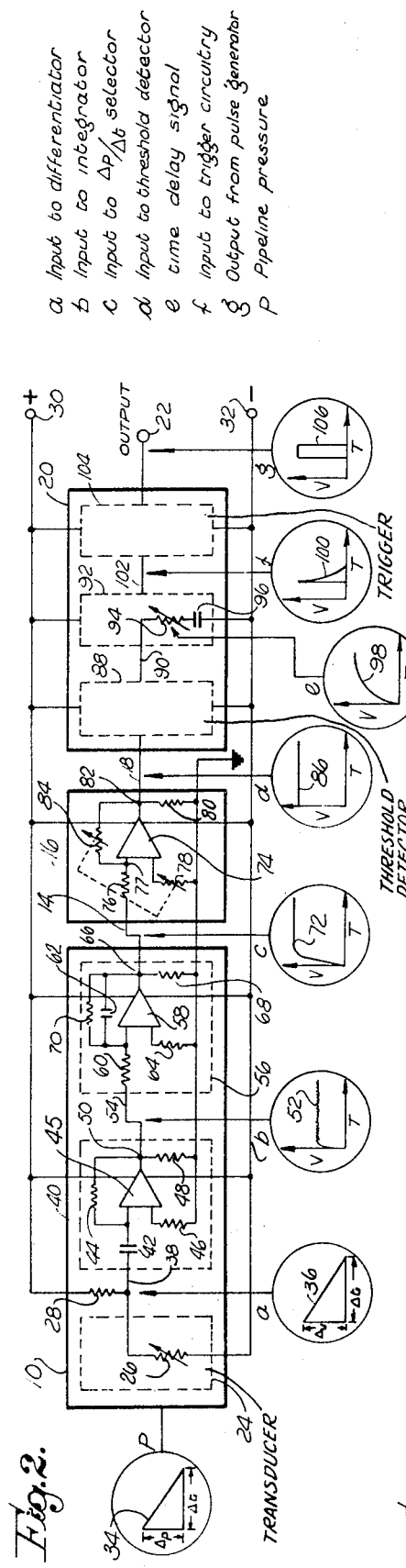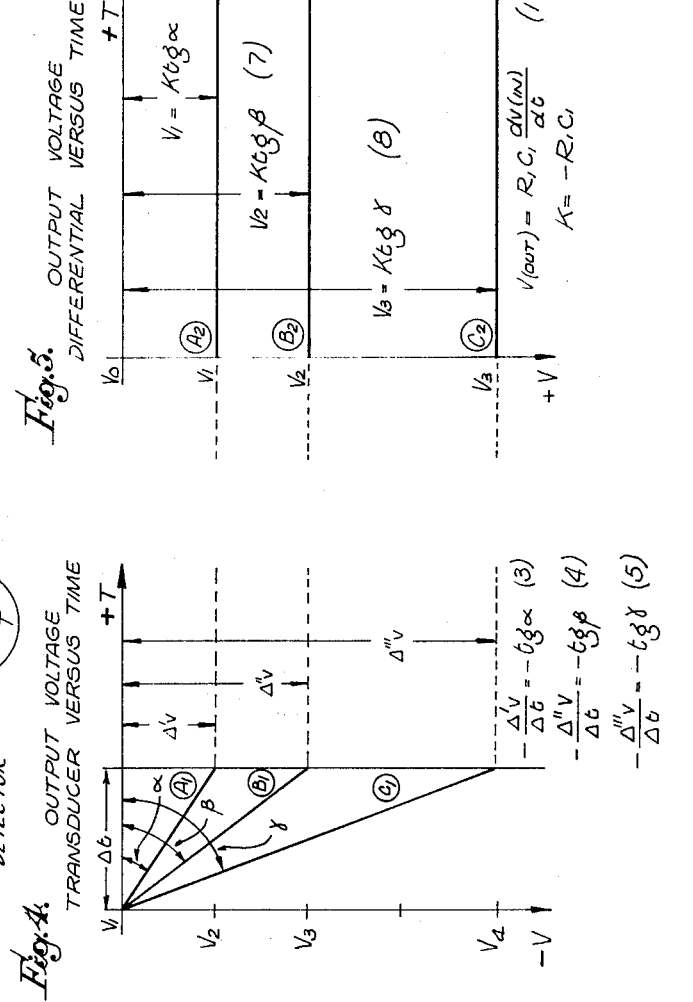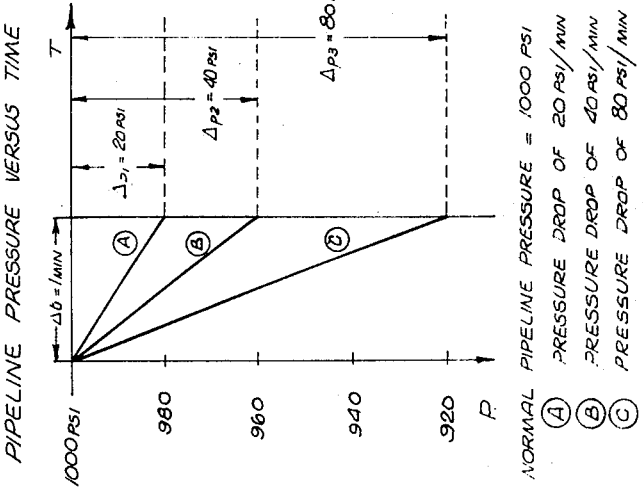

APPARATUS FOR MONITORING PRESSURE VARIATIONS IN A FLUID PRESSURE SYSTEM

BACKGROUND OF THE INVENTION

This invention relates generally to apparatus for monitoring fluid pressure systems and in particular to monitoring apparatus that will provide a signal to sound a warning or actuate a device should the pressure in the system change a predetermined amount during a given period of time.

The invention has utility wherever a fluid pressure system is employed. The invention, however, has a particular utility for monitoring gas and/or oil pipelines to effect closure of valves, to shut down compressors, or to sound warning devices should a rupture occur in the pipeline. In the event of such rupture, it is important to immediately isolate the same to reduce to a minimum the amount of oil or gas released thereby reducing to a minimum the environmental contamination and/or fire danger present from such spillage.

Heretofore, monitoring apparatus for fluid pressure systems, where a rate of change of pressure is being monitored, typically utilizes an orifice between a pressure accumulator and the pipeline to provide a pressure drop thereacross. When the pressure in the line falls below that in the accumulator, the magnitude of the pressure differential thus created was a function of the pressure drop, the time period over which it occurred and the sizing of the orifice. Thus, orifice sizing becomes extremely critical so that the monitoring apparatus is actuated only as a result of a break in the line, and not as a result of normal pressure fluctuations in the line resulting from system operation. In some prior art applications, system pressure variations have been detected through comparison of system pressure at some previous point in time, as established by an isolated pressure accumulator, with present system pressure and, in the event of a discrepancy therebetween of a predetermined amount remaining over a predetermined period of time, then an output signal is generated indicative thereof. Typical examples of such prior art systems are U.S. Pat. Nos. 2,103,962, 2,160,766, 2,871,876, 3,481,362, and U.S. Patent application Ser. No. 64,273, filed Aug. 17, 1970, now U.S. Pat. No. 3,612,081 and assigned to the same assignee as the present invention.

Although these prior art systems operate extremely well for the purposes intended, certain difficulties are inherent therein. Such difficulties emanate from the utilization of fluid pressure for the purposes of comparison and detection of the system pressure variations. Such utilization necessarily requires reference pressures, restriction orifices which may become blocked or worn, valving timers and the like. Thus, difficulty may be encountered in maintaining proper adjustments and in making settings of various pressure sensitive apparatus in the system. In addition thereto, operation of the system may result in some spillage of the oil or gas in the system.

SUMMARY OF THE INVENTION

This invention includes electronic apparatus for detecting system pressure variations of predetermined magnitude occurring for a predetermined period of time which will generate an output signal indicative thereof and which includes transducer means for receiving system pressure and generating an electrical signal proportional to the rate of change thereof, detector means for comparing the electrical signal which is proportional to the rate of change of system pressure with a reference and for producing an output signal only when the rate of change proportional signal exceeds the reference, and a signal generator for producing an actuating signal when the signal generated by the detector means is maintained in existence for a predetermined period of time.

BRIEF DESCRIPTION OF THE DRAWINGS

FIG. 1 is a block diagram illustrating, generally, monitoring apparatus in accordance with the present invention;

FIG. 2 is a schematic diagram partially in block form illustrating monitoring apparatus in accordance with the present invention in further detail and illustrating voltage wave forms taken at various points throughout the circuit;

FIG. 3 is a graph illustrating typical pressure variations in the event of a pipeline rupture;

FIG. 4 is a graph illustrating output voltages from a pressure transducer sensing the pressure variations illustrated in the graph of FIG. 3;

FIG. 5 is a graph illustrating typical output voltages proportional to the rates of change of pressure as illustrated in FIG. 3;

FIG. 6 is a schematic diagram illustrating, in further detail, one embodiment of a threshold detector useful in the present apparatus;

FIG. 7 is a schematic diagram illustrating, in further detail, one embodiment of variable time delay and trigger circuit useful in the present apparatus;

FIG. 8 is a schematic diagram illustrating a time delay apparatus useful for placing apparatus in accordance with the present invention into additional operation.

DETAILED DESCRIPTION OF THE INVENTION

Referring now to FIG. 1, there is illustrated in block diagram form apparatus in accordance with the present invention. As is therein illustrated, a transducer means 10 is connected to a source of system pressure 12 which may, for example, be a gas transmission pipeline having typical pressures therein varying between 600 to 1,000 pounds per square inch. The transducer means 10 receives system pressure from the source 12 and functions to provide an electrical signal on the lead 14 which is proportional to the rate of change of system pressure. Therefore, the transducer means must include apparatus for receiving directly the system pressure and producing an electrical signal which is proportional thereto. The electrical signal thus produced must then be differentiated to provide an electrical signal which is proportional to the rate of change of the pressure.

The electrical signal appearing on the lead 14 is connected to a detector means 16. The detector means 16 functions to compare the signal appearing on the lead 14 to a predetermined electrical reference. When the rate of change signal appearing on the lead 14 equals or exceeds the reference, that is, is detected, then an electrical signal appears on the lead 18 indicative thereof. The signal appearing on the lead 18 is applied to an actuating signal generator 20. The actuating signal generator produces a signal appearing at terminal 22 only when the signal appearing on the lead 18 is maintained for a predetermined period of time. The time period is determined in accordance with the parameters for a particular fluid pressure handling system being monitored so as to detect undesirable pressure variations. For example, in the event of a pipeline rupture, the pressure appearing in the system decreases at some predetermined rate indicating the occurence of the catastrophe. Similar rates of change could occur for non-catastrophic occurrences, such as those resulting from normal pipeline operation. However, these rates of change of system pressure will be maintained only for very short durations in the event of normal pipeline operation, whereas, in the event of a catastrophic rupture, the rate of change of pressure will continue for a sustained period of time. If such signal is maintained for such sustained period of time, then the output signal will appear at the terminal 22 as above indicated.

Referring now to FIG. 2, the apparatus generally illustrated in FIG. 1 is shown in further detail. For purposes of further illustration and clarity of understanding, there is also illustrated in FIG. 2 a graphic representation of signals (pressure or voltage) produced with respect to time at specified points throughout the schematic diagram shown in FIG. 2. In each case, voltage (or pressure) is illustrated on the ordinate with time on the abscissa. Such graphs are illustrated within the circles labeled $a$ through $g$ and $p$, along with a legend identifying each of the wave forms.

The transducer means 10 includes a pressure to voltage transducer 24 which is illustrated in the form of a variable resistor 26 connected in series with a resistor 28 across the terminals 30-32, marked positive and negative, respectively, of the power supply. The pressure to voltage transducer may take any form known to the art and, as one example, may be a semiconductor strain gauge which is affixed to a diaphragm which is, in turn, held in a structure that may be connected directly to the pipeline and thus be subjected to the pressure appearing therein. As the system pressure varies, the diagragm is caused to move and the semiconductor, in turn, flexes or bends. As the semiconductor flexes, the resistance therein changes proportionally to the changes in the pressure present in the system. Since the semiconductor is connected across the power supply and the resistance from the flexing thereof changes, the voltage thereacross will also change in accordance with the changing resistance. As a result, the voltage across the semiconductor 26 will vary proportionally to the pressure appearing in the system. As will be recognized by those skilled in the art, the semi-conductor strain gauge 26 may take the form of a bridge circuit, or the like, if such be desired. However, in accordance with the present invention, a single ended semiconductor strain gauge has been utilized because it has a relatively high resistance and, therefore, provides low power consumption which is one of the unique features of apparatus in accordance with the present invention.

As will be recognized by those skilled in the art, as the system pressure appearing in the source 12 rapidly drops, as a result of a catastrophic failure, as is illustrated by the curve 34, illustrating change of pressure with respect to time, the voltage signal appearing across the strain gauge 26 will be represented by the curve 36, thus indicating a drop in voltage with respect to time. Thus, the voltage signal 36 follows the pressure signal 34 directly. The voltage signal 36 is applied by way of lead 38 to an active differentiator 40. The active differentiator 40 includes the typical capacitor-resistor differentiator circuit consisting of capacitor 42 and resistor 44. An operational amplifier 45 is also connected in the circuit and has one input terminal connected to the junction between the capacitor 42 and the resistor 44 with the other input terminal connected to the balancing resistor 46 which in turn is connected to common or ground as shown. A load resistor 48 is connected between the output terminal 50 of the operational amplifier and common. As should be noted, the differentiating resistor 44 is also connected to the output terminal 50 of the operational amplifier 45. It will therefore be understood by those skilled in the art that the resistor 44 is in the feedback path of the operational amplifier 45. This type of interconnection, with an operational amplifier, of a differentiating circuit is to be understood, in accordance with the context of the present invention, as an active differentiator 40. Assuming the input signal is, as represented at 36, a linear voltage signal, there will be a constant output voltage as shown by wave form 52. However, as indicated by the variations of the wave form 52, the output signal from the active differentiator 40 will contain substantial noise. Such variations may include noise generated by the transducer 24, variations within the pressure signal 34 as it decreases, or other electrical noise that may be picked up or generated in other parts of the circuit. Since such noise signals by definition are rapid changes in voltage therefore and the differentiation thereof will further accentuate them and cause them to further influence the voltage signal 52.

The output signal appearing at the output terminal 50 of the active differentiator 40 is applied by lead 54 to an integrator 56 which functions as a low pass filter to thereby smooth out the noise fluctuations appearing in the signal 52. The active integrator 56 includes an operational amplifier 58 having connected in the input and feedback paths thereof the well-known resistance-capacitance integrator circuit. Such integrator circuit is indicated by the resistor 60 and the capacitor 62 which are series connected with the common connection therebetween connected to one input of the operational amplifier 58, the other input being connected through a resistor 64 to common. The other terminal of the capacitor 62 is connected to the output terminal 66 of the operational amplifier 58 and load resistor 68 is also connected between the output terminal 66 and common. This type of interconnection, with an operational amplifier, of an integrating circuit is to be understood, in accordance with the context of the present invention, as an active integrator. An additional resistor 70 is also connected in parallel with the capacitor 62 for purposes of establishing the gain of the operational amplifier 58 as will be recognized by those skilled in the art. Thus, the output signal appearing at the output terminal 66 of the operational amplifier 58 will be the voltage signal 52 amplified and smoothed and is as represented at 72. Thus, it can be seen that the voltage signal 72 is proportional to the rate of change of pressure appearing in the pipeline as indicated at 34. Obviously, if the rate of change of the pressure in the pipeline is different from that as illustrated at 34, the voltage 72 will be at a different level, that is, various criteria may be established for various pipelines by companies operating those piplines, depending upon the particular parameters involved as indicative of a catastrophic break therein.

By reference to FIGS. 3, 4 and 5, typical examples of such pressure variations and the signals resulting thereform are indicated. As is illustrated in FIG. 3, which is a plot of pipeline pressure on the ordinate versus time of the abscissa, catastrophic breaks may be assumed to be indicated by a minimum pressure drop of 20 PSI per minute as shown on curve A, 40 PSI per minute as shown on curve B, or 80 PSI per minute as shown on curve C. Under these circumstances, a transducer of the type above-described would provide an output voltage as is illustrated in FIG. 4 proportional to such pressure drops. In FIG. 4, voltage is plotted along th ordinate with respect to time along the abscissa. As is shown, a drop in pressure of 20 PSI will generate a voltage having an angle $\alpha$ (alpha) with respect to the ordinate and will follow a curve $A_1$ which is the tangent of $\alpha$ (alpha). Similarly, curves $B_1$ and $C_1$ follow the tangents of the angles $\beta$ (beta) and $\gamma$ (gamma) as illustrated. See formulas (3), (4) and (5) on FIG. 4. Such variations will generate an output voltage from the active differentiator as illustrated in FIG. 5 wherein voltage is plotted along the ordinate against time on the abscissa. As is therein shown, the curve $A_2$ corresponds to a change in pressure of 20 PSI, curve $B_2$ to a change in pressure of 40 PSI, and the curve $C_2$ to a change in pressure of 80 PSI. In each instance, the voltage may be determined by the gain of the differential amplifier 45 multiplied by the derivative of the voltage applied as the input signal to the operational amplifier 45. Such is illustrated by the formula (1) shown on FIG. 5 where V (out) is the curve 52, as shown in FIG. 2, $R_1$ is resistor 44, $C_1$ is capacitor 42 and $d_V$ (in) is voltage 36.

As previously indicated, the change of voltage with respect to time, FIG. 4, is equal to the tangent of the angles $\alpha$ (alpha), $\beta$ (beta), $\gamma$ (gamma), respectively ad, thus, that function may be substituted for $d_{V\ (in)}/d_t$ and the function $R_1$, $C_1$ is a constant, then each of the voltages shown by curves $A_2$, $B_2$ and $C_2$ may be represented respectively by a constant (K) times the tangent of the respective angle, as shown by the formulas (6), (7) and (8) on FIG. 5.

Referring again to FIG. 2, the output voltage 72 is applied by the lead 14 to the detector means 16. As illustrated, the detector means 16 includes an operational amplifier 74 having the voltage 72 connected through an input resistor 76 to one input terminal thereof. The other input terminal is connected through a variable resistor 78 to common. A load resistor 80 is connected from the output terminal 82 to common while a feedback resistor 84 is connected between the output terminal 82 and the input terminal of the operational amplifier 74. The feedback resistor 84 is adjustable as indicated, and may be adjustable either continuously or in descrete steps so as to provide a predetermined output voltage on the lead 18 in response to a predetermined input voltage 72 appearing at the lead 14. That is, if a particular pipeline system is designed such that a catastrophic break would be indicated by a pressure drop of 20 PSI, then the gain adjusting resistor 84 would be adjusted so to provide a predetermined output signal at the lead 18 in response to appearance at the lead 14 of a voltage proportional to a pressure drop of 20 PSI. On the other hand, if the particular pipeline system required a pressure drop of 80 PSI to indicate a catastrophic failure, then the gain adjusting resistor 84 would be adjusted to provide the same voltage at the lead 18 for the voltage signal appearing on lead 14 which is proportional to 80 PSI as was the case for that where the pressure drop was 20 PSI. Thus, it will be recognized that the voltage signal 86 will have a minimum predetermined value in all cases in response to a voltage signal appearing at lead 14 the value of which is proportional to the predetermined drop in system pressure representative of a catastrophic failure for the particular pipeline being monitored. Obviously, the voltage signal 86 appearing on lead 18 may be greater or lesser than this amount. But, in the event it is a lesser amount, such signal will be ignored by the actuating signal generator 20. Such will become more apparent after consideration of the detailed circuits appearing in the actuating signal generator 20 which will be further discussed hereinbelow.

As is generally illustrated in FIG. 2, the actuating signal generator 20 includes a threshold detector 88 which receives the voltage signal 86 appearing on lead 18. In the event the voltage signal 86 equals or exceeds a predetermined threshold as established by the threshold detector 88, a signal is applied by way of the lead 90 to a variable time-delay 92 which is represented, for purposes of example only, by a variable resistor 94 connected in a series with a capacitor 96 so as to generate a typical charging curve 98 as is well-known in the art. When the charge on the capacitor 96 reaches a predetermined level representative of the time established by the R/C time constant of the resistor 94 and capacitor 96, an output voltage triggering signal 100 will be applied by the lead 102 to a trigger circuit 104 which will in turn generate a voltage pulse 106 having a predetermined time duration sufficient to actuate a device capable of signalling or otherwise providing a desired operation indicative of a catastrophic failure in the pressure system being monitored. Further details of the threshold detector, variable time delay, and the trigger circuit and pulse generator may be obtained by reference to FIGS. 6, 7 and 8 which is now hereby made.

FIG. 6 schematically illustrates a preferred embodiment of the threshold detector 88. As is therein illustrated, the voltage signal 86 is applied by way of lead 18 to a series connected resistor 110 and capacitor 112, the capacitor also being connected to the negative terminal 32 of the power supply.

The anode 116, a programmable unijunction transistor (PUT) 114 is connected to the common point 118 between the capacitor 112 and the resistor 110, the cathode 120 of which is connected through the resistor 122 to the hegative terminal 32 of the power supply. The gate 124 of the (PUT) 114 is connected through a series of diodes 126, 128 and 130 to a voltage divider network of resistors 132, 134 and 136, resistor 134 being a potentiometer, which is connected across the plus and minus terminals 30, 32 of the power supply. The diodes 126, 128 and 130 are utilized for temperature compensation of the programmable unijunction transistor (PUT) 114. The gate of (PUT) 114 being connected to the arm 138 of the potentiometer 134 of the voltage divider establishes a level of voltage on the gate of the (PUT) 114 which controls when the (PUT) 114 will conduct. That is, if the voltage appearing on the anode 116 exceeds that established by the setting of arm 138, then (PUT) 114 will conduct.

Thus, the setting of the arm 138 sets the threshold voltage as established for the particular parameters that indicate a pressure rate of change indicating a catastrophic failure for a particular system being monitored. When the voltage appearing at lead 18 charges the capacitor 112 to a degree sufficient to slightly exceed the voltage appearing on the gate 124, the (PUT) 114 will conduct. Such conduction provides a negative going spike across the load resistor 140 which is connected between the gate 124 and negative terminal 32. The spike is coupled through the capacitor 142 and is applied to the gate 144 and also the anode 146 through the resistor 148 simultaneously of the programmable unijunction transistor (PUT) 150. The cathode 152 of (PUT) 150 is connected through a capacitor 154 to the negative terminal 32 of the power supply. (PUT) 150 is connected in such a fashion that it will operate as a Silicon Controlled Rectifier (SCR). Thus, when the negative going spike appears on the gate 144 and anode 146 of (PUT) 150, (PUT) 150 becomes conductive and, since it is operating as an SCR, remains conductive, even though only a momentary spike has been applied thereto. As a result (PUT) 150 operates as a switch connecting essentially the entire power supply across the capacitor 154 and the resistor 156 which are connected in parallel.

Referring now to the programmable unijunction transistor (PUT) 160, it will be noted that there is a voltage divider comprising resistors 162 and 163 connected between the lead 164 and the negative terminal 32 of the power supply. The lead 164 upon the conduction of (PUT) 150 has applied thereto, because of the charge appearing on the capacitor 154, essentially the voltage of the power supply. Only the voltage drops across the resistor 164 and the (PUT) 150 are lost. This voltage is divided by the voltage idvider 162–163 so that appearing on that gate 166 of (PUT) 160 is a predetermined reference voltage. The voltage appearing between the lead 164 and the negative terminal 32 is applied simultaneously to the resistor 168 and the capacitor 170 thus causing the capacitor 170 to charge. The common point between capacitor 170 and resistor 168 is connected to the anode 172 of (PUT) 160. As capacitor 170 charges, the voltage thereacross will become equal to and then exceed the voltage appearing on the gate 166 of (PUT) 160 such that (PUT) 160 will then become conductive. Such condition will develop a positive going signal across the resistor 174 connected between the cathode 176 of the (PUT) 160 and negative terminal 32. The positive going signal is coupled by the diode 178 and the capacitor 180 to the lead 164 where it effectively rides upon the voltage appearing thereon. Such occurs because capacitor 180 is connected by resistor 182 to the negative terminal 32 and is charged to the potential appearing between it and lead 164. Then this positive going signal is applied to the cathode of the (PUT) 150 in such a manner as to cause it to cease conduction. By causing (PUT) 150 to cease conduction as just explained, the effect of transient signal appearing at lead 18 tending to place the circuit in operation is overcome. Such is accomplished by choosing the particular time constants of the R/C circuit comprised of the resistor 168 and capacitor 170 so that (PUT) 160 operates as an oscillator having a relatively long period (approximately 2 seconds) while the (PUT) 114 having the resistor 110 and capacitor 112 in the input thereof connected to the anode, has a time constant such that the period thereof is relatively short (approximately 1 millisecond).

If, however, the signal appearing at the lead 18, which is the input (PUT) 114, is not a transient, but is in fact a true signal such that the voltage thereon remains substantially constant as a result of the output of the operational amplifier 74 (FIG. 2), then (PUT) 114 continues to provide a series of signals (pulses) such that, even though the output signal from (PUT) 160 would tend to turn (PUT) 150 off, the output pulse from (PUT) 114 immediately returns (PUT) 150 to the conductive state. As a result thereof, there will then be provided on lead 164 a substantially constant output voltage. Such substantially constant voltage is the output of the threshold detector 88 and is applied through terminal 184 as the input signal to the variable time delay circuit 92 which will now be described by reference to FIG. 7.

As is shown in FIG. 7, another programmable unijunction transistor (PUT) 190 has the gate 192 thereof connected through a temperature compensating diode 194 to the arm 196 of a potentiometer 198. The potentiometer 198 is part of a voltage divider including resistors 200 and 202 connected between the positive and negative terminals of the power supply. Adjustment of the arm 196 establishes the voltage level required on the anode 204 of (PUT) 190 to effect conduction thereof. The cathode 206 of (PUT) 190 is connected through resistor 208 to the negative terminal 32 of the power supply. A resistor 210 is connected between gate 192 and the negative terminal of the power supply.

The voltage appearing at the anode 204 of (PUT) 190 is determined by the charge appearing across capacitor 212 which is connected between anode 204 and the negative terminal 32 of the power supply. Series connected variable resistor 214 and fixed resistor 216 are connected in series between terminal 184 and anode 204 of (PUT) 190.

The resistors, including the fixed resistor 216 and the variable resistor 214 along with the capacitor 212 provide an R/C circuit having a very long time constant. For example, the time constant is variable between predetermined limits, for example only, from approximately 10 seconds to approximately 100 seconds. The particular time to be selectable depending upon the particular applications to which the line break detector is being put. When the variable resistor 214 is in its lowest resistance position, only the fixed resistor 216 and the capacitor 212 are in the circuit thus establishing the lowest time constant (approximately 10 seconds). Thus, when the voltage appears at the terminal 184 for approximately 10 seconds, the charge appearing on capacitor 212 is such that it will trigger the (PUT) 190 into the conducting state.

As will be readily recognized by those skilled in the art, the time required to charge capacitor 212, to be always the same, requires capacitor 212 have no residual charge thereon. To preclude retention of the small charges placed thereon by momentary actuation through transients in the system, there is provided a diode 213 connected between terminal 184 and capacitor 212. Diode 213 is poled so that a positive charge with respect to terminal 184, on capacitor 212 appearing at anode 204 will be removed.

When (PUT) 190 thus conducts, a positive voltage appears across the resistor 208 in its cathode 206 which positive signal is coupled through the blocking diode 211 and the capacitor 215 and appears across the resistor 221 connected between the gate 217 and the cathode 219 of the SCR 218. The anode 222 is connected to the positive terminal of the power supply while the cathode 219 is connected to one terminal of the coil 220 of a latching solenoid, the other terminal thereof being connected to the negative terminal 32 of the power supply. When the positive going signal appears on the gate 217 the SCR 218 is triggered to the conductive state, thus applying the entire voltage appearing across the terminals of the power supply to the coil 220 of the latching solenoid.

The solenoid is chosen in such a way that it will require some predetermined time of power application, for example, approximately two hundred to five hundred milliseconds, in order to effect operation thereof. Once the solenoid has operated it will magnetically latch itself into that condition and stay thusly operated irrespective of the application of power thereto. Thus, it becomes imperative, to preclude draining of the batteries which provide the power, that the power supply be disconnected from the coil 220 after a time delay of sufficient magnitude to insure that the solenoid has in fact operated and latched. A non-polarized electrolytic capacitor 224 is connected between the cathode 219 of SCR 218 and the cathode 226 of SCR 228, the anode 230 of which is connected to the positive terminal of the power supply. The cathode 226 of SCR 228 is also connected through resistor 232 to the negative terminal of the power supply. A resistor 235 is connected between the cathode 226 and the gate 234 of SCR 228. Also connected to the cathode 219 of SCR 218 is series connected resistor 236 and capacitor 238, which is also connected to negative terminal 32 of the power supply. The junction between the resistor 236 and the capacitor 238 is connected to the anode 240 of the (PUT) 242. The gate 244 of (PUT) 242 is connected to the common point between series connected resistors 246 of 248 which are connected between cathode 219 and SCR 218 and negative terminal 32. A resistor 250 is connected between cathode 252 and terminal 32.

When the voltage is connected across the coil 220, by conduction of SCR 218 the capacitor 224 is charged plus (-) to minus ( ) as illustrated on the drawing. At the same time, the voltage appearing across the coil 220 is applied to the R/C time constant circuit consisting of the resistor 236 and the capacitor 238 having a time constant such that the voltage appearing on the anode 240 of the (PUT) 242 arrives at approximately the voltage applied by the voltage divider circuit 246, 248 connected to the gate 244 of (PUT) 242 approximately 500 milliseconds after the SCR 218 conducts. When such occurs, (PUT) 242 becomes conductive, applying a positive pulse through the lead 254 and the diode 256 to the gate 234 of the SCR 228 causing it to become conductive. When SCR 228 becomes conductive, it effectively applies the charge on capacitor 224 across the SCR 218 in such a way that it will cause SCR 218 to become non-conductive. SCR 228 is designed with its circuit in such a way that insufficient holding current is provided thereto for SCR 228 to remain on once the positive going pulse generated by (PUT) 242 has been applied and disappears. Thus, when the function of SCR 228 is completed, both SCR 228 and SCR 218 are in the off (non-conductive) condition.

At the time the power supply is connected across the coil 220, the load thus imposed thereon will cause the voltage to momentarily drop in amount sufficient that the input to operational amplifier 45 (FIG. 2) will appear as a variation on the transducer 24 in an amount sufficient to appear there has been another failure (line break) and the circuit will operate again causing application of power once again to coil 220. To preclude this, a feedback signal is developed across resistor 260 and is connected through a resistor 262 and a diode 264 to lead 38, which is the input to operational amplifier 45 (FIG. 2) in such a way as to compensate for the drop in power supply voltage.

At the time the circuit is first energized, it requires approximately three minutes before all of the various capacitors in the circuit have charged and stabilized. The circuit shown generally in FIG. 8 is utilized for the purpose of rendering the entire system ineffective during the period of time required for such stabilization. The circuit includes again a programmable unijunction transistor (PUT) 270 which is similar to that previously discussed and having a long time constant R/C network in the anode 276 circuit thereof. Approximately three minutes is required for a charge to appear across the capacitor 274 of sufficient magnitude to cause (PUT) 270 to conduct.

The conducting level is established by a voltage divider comprising resistors 278 and 280 connected between the negative terminal 32 of the power supply and the lead 282. A voltage is applied to the lead 282 through conduction of (PUT) 284 which is connected to operate as an SCR. As is shown, the gate 286 and anode 288 are connected together through the resistor 290 and then to the positive terminal 30 of the power supply. A capacitor 292 is connected between the gate 286 and the negative terminal 32 while a resistor 287 is connected from terminal 32 to the cathode 294.

Upon energization of the circuit, the R/C time constant of resistor 290 and capacitor 292 is such that the voltage appearing across the capacitor 292 is sufficient to cause (PUT) 270 to energize and conduct. Substantially the power supply voltage appears on the lead 282 which is connected through the diode 296 and the resistor 298 as a positive input to the terminal 77 of the operational amplifier 74.

This positive signal drives the voltage on lead 18 sufficiently negative during the application thereof so that the remainder of the circuit does not sense any amount of signal which exceeds the preset threshold. After the three minute period has elapsed, the voltage appearing on the capacitor 274 causes (PUT) 270 to become conductive which in turn generates a pulse of proper polarity to be applied through the capacitor 300 to then cause (PUT) 270 to become non-conducting and the system to become operative for sensing pressure variations therein.

1. Electronic apparatus for developing an output signal responsive to a decrease in pressure of predetermined magnitude representative of a rupture in a fluid handling system comprising:
    transducer means for receiving system fluid pressure and generating a first electrical signal proportional to the rate of change of system fluid pressure;
    detector means for comparing said first electrical signal to a predetermined electrical reference and for producing a second electrical signal only when said first electrical signal is representative of said decrease in pressure and thereby equals or exceeds said reference;
    means connecting said first electrical signal to said detector means;
    actuating signal generator means responsive to production of said second electrical signal for delaying effectiveness of said second electrical signal until expiration of a predetermined period of time and for producing an actuating signal only when said second electrical signal is maintained for at least said predetermined period of time; and means connecting said second electrical signal to said actuating signal generator means.

2. Apparatus according to claim 1 wherein said transducer means includes a pressure to electrical signal transducer connected to system pressure for providing an electrical signal proportional to system pressure and electrical signal differentiator means connected to receive said electrical signal from said transducer and to provide said signal proportional to said rate of change.

3. Apparatus according to claim 2 wherein said differentiator means is an active differentiator.

4. Apparatus according to claim 2 wherein said transducer means further includes a low pass filter means connected to receive said signal proportional to said rate of change.

5. Apparatus according to claim 4 wherein said low pass filter means includes an active integrator means.

6. Apparatus according to claim 1 wherein said detector means includes a threshold detector for producing an output signal only when said first electrical signal equals or exceeds said reference.

7. Apparatus according to claim 6 wherein said threshold detector includes transient signal detecting means for rendering said threshold detector effective only in the presence of a continuing first electrical signal.

8. Apparatus according to claim 7 wherein said transient detecting means includes switch means for applying an electrical signal to the output of said threshold detector, signal level detecting means connected to cause said switch means to apply said electrical signal to said output only when said first electrical signal is equal to or exceeds said reference, electrical pulse producing means responsive to said switch means applying said electrical signal to said output of said threshold detector for producing an electrical pulse a predetermined period of time after said application to said output terminal, and means for applying said pulse to said switch means for rendering said switch means ineffective.

9. Apparatus according to claim 8 wherein said switch means is a normally non-conducting SCR and said pulse producing means is an oscillator.

10. Apparatus according to claim 9 wherein said signal level detecting means is a first programmable unijunction transistor.

11. Apparatus according to claim 1 wherein said actuating signal generator includes a second programmable unijunction transistor and electronic switch means, said second programmable unijunction transistor being conductive only when said second electrical signal is maintained for said predetermined period of time, said electronic switch means being responsive to said second programmable unijunction transistor becoming conductive to produce said actuating signal.

12. Apparatus according to claim 11 which further includes pulse generator means responsive to said electronic switch means producing said actuating signal to produce a pulse means coupling said pulse to said electronic switch means for rendering said electronic switch means ineffective.

13. Electronic apparatus for developing an output signal responsive to a decrease in pressure of predetermined magnitude representative of a rupture in a fluid handling system comprising:

transducer means for receiving system fluid pressure and generating a first electrical signal representative of changes in system fluid pressure;

means providing a reference electrical signal;

detector means for comparing said first electrical signal to said electrical reference signal and for producing a second electrical signal only when said first electrical signal is representative of said decrease in pressure and thereby differs in a predetermined fashion from said reference signal;

means connecting said first electrical signal and said reference signal to said detector means;

actuator signal generator means responsive to production of

UNITED STATES PATENT OFFICE
CERTIFICATE OF CORRECTION

Patent No. 3,748,656     Dated July 24, 1973

Inventor(s) Samuel A. Gray et al.

It is certified that error appears in the above-identified patent and that said Letters Patent are hereby corrected as shown below:

Column 2, line 32, after "of" insert --a--;

Column 3, line 32, change "hegative" to --negative--;

Column 5, line 12, change "th" to --the--;

Column 5, line 54, change "descrete" to --discrete--;

Column 6, line 49, change "hegative" to --negative--;

Column 7, line 32, change "idvider" to --divider--;

Column 9, line 18, change "dalay" to --delay;

Column 9, line 30, change "hegative" to --negative--;

Column 9, line 40, change "plus (-) to minus ( )" to --plus (+) to minus (-)--;

Column 12, line 42, after "of" insert the following:

--said second electrical signal for initiating a timing period for controlling effectiveness of said second electrical signal; and means for connecting said second electrical signal to said actuating generator means.--

Signed and sealed this 8th day of January 1974.

(SEAL)
Attest:

EDWARD M. FLETCHER, JR.
Attesting Officer

RENE D. TEGTMEYER
Acting Commissioner of Patents

UNITED STATES PATENT OFFICE
CERTIFICATE OF CORRECTION

Patent No. 3,748,656          Dated July 24, 1973

Inventor(s) Samuel A. Gray, et al.

It is certified that error appears in the above-identified patent and that said Letters Patent are hereby corrected as shown below:

Column 5, lines 4 and 5 "time of the abscissa" should read -- time on the abscissa --.

Signed and sealed this 7th day of May 1974.

(SEAL)
Attest:

EDWARD M.FLETCHER,JR.　　　　　　　　C. MARSHALL DANN
Attesting Officer　　　　　　　　　　Commissioner of Patents